US011966593B1

(12) United States Patent
McSweeney et al.

(10) Patent No.: US 11,966,593 B1
(45) Date of Patent: Apr. 23, 2024

(54) AUTO-CORRECT HEALTH SCORE RELATED TO ALERTS FROM STORAGE OBJECTS

(71) Applicant: Dell Products L.P., Hopkinton, MA (US)

(72) Inventors: Paul McSweeney, Silver Springs (IE); Ellen Murphy, Whites Cross (IE); Aaron Twohig, Swinford (IE)

(73) Assignee: Dell Products L.P., Hopkinton, MA (US)

( * ) Notice: Subject to any disclaimer, the term of this patent is extended or adjusted under 35 U.S.C. 154(b) by 36 days.

(21) Appl. No.: 18/079,993

(22) Filed: Dec. 13, 2022

(51) Int. Cl.
*G06F 12/00* (2006.01)
*G06F 3/06* (2006.01)

(52) U.S. Cl.
CPC .......... *G06F 3/0619* (2013.01); *G06F 3/0653* (2013.01); *G06F 3/067* (2013.01)

(58) Field of Classification Search
CPC ...... G06F 3/0619; G06F 3/065; G06F 3/0654; G06F 3/067
USPC ........................................................ 711/154
See application file for complete search history.

(56) References Cited

U.S. PATENT DOCUMENTS

| 8,229,898 | B1 * | 7/2012 | Pype | G06F 11/1469 |
| | | | | 707/686 |
| 11,281,673 | B2 * | 3/2022 | Nanda | G06F 16/288 |
| 2015/0113337 | A1 * | 4/2015 | Otsuka | G06F 11/0709 |
| | | | | 714/47.3 |
| 2015/0205849 | A1 * | 7/2015 | Jayapal | G06F 16/27 |
| | | | | 707/636 |
| 2023/0070038 | A1 * | 3/2023 | Witte | G06F 11/0769 |
| 2023/0376496 | A1 * | 11/2023 | Jacob | G06F 16/2471 |
| 2023/0394057 | A1 * | 12/2023 | Tah | G06F 16/285 |

* cited by examiner

*Primary Examiner* — Mohamed M Gebril
(74) *Attorney, Agent, or Firm* — Anderson Gorecki LLP (57) ABSTRACT

Storage array health scores based on alerts are auto-corrected by using alert validation and alert matching to identify missed, stale, and redundant alerts. In response to restoration of an event daemon or reboot of a storage management server, each alert associated with each storage array is validated to determine whether current state of storage array hardware or a logical object differs from the state indicated in the alert. Alerts that differ from current state are updated or invalidated and the health score is recalculated. Responsive to receipt of a new alert, existing alerts associated with the same storage array hardware or logical object are identified and Jaro-Winkler distance between the identified alerts and the new alert is calculated. Any existing alert for which the Jaro-Winkler distance relative to the new alert is greater than or equal to 0.9 is deleted and the health score is recalculated.

20 Claims, 6 Drawing Sheets

AUTO-CORRECT HEALTH SCORE RELATED TO ALERTS FROM STORAGE OBJECTS

TECHNICAL FIELD

The subject matter of this disclosure is generally related to data storage systems.

BACKGROUND

Institutional data storage systems maintain storage objects that contain data used by instances of host applications running on host servers. Examples of host applications may include, but are not limited to, software for email, accounting, manufacturing, inventory control, and a wide variety of other institutional processes. Each storage object is a logical storage device that abstracts the storage space of arrays of non-volatile disk drives. A separate storage object or group of storage objects may be created for each host application. The operational state of the logical and physical elements of the storage arrays is monitored by a management server and used to calculate health scores.

SUMMARY

Some of the inventive concepts disclosed herein are predicated in part on recognition that health score calculations are subject to errors caused by missed, stale, and redundant alerts.

An apparatus in accordance with some implementations comprises: a storage management server configured to manage a storage array comprising a plurality of tangible data storage devices and a plurality of compute nodes, each compute node comprising at least one processor and memory, wherein the compute nodes present at least one production volume to a host application, the production volume being backed by the tangible data storage devices, the storage management server comprising program code stored on non-transitory computer-readable memory and including instructions that calculate a health score for the storage array based on alerts that indicate status changes of an object or hardware associated with the storage array, the program code comprising instructions responsive to receipt of a new alert to: match the object or hardware identified in the new alert to the object or hardware identified in an existing alert; calculate Jaro-Winkler distance between the new alert and the matched existing alert; and responsive to a determination that the Jaro-Winkler distance between the new alert and the matched existing alert is greater than or equal to 0.9, delete the matched existing alert and update the health score.

A method in accordance with some implementations comprises: calculating a health score for a storage array based on alerts that indicate status change of an object or hardware associated with the storage array; and responsive to receipt of a new alert: matching an object or hardware identified in the new alert to the object or hardware identified in an existing alert; calculating a Jaro-Winkler distance between the new alert and the matched existing alert; and responsive to a determination that the Jaro-Winkler distance between the new alert and the matched existing alert is greater than or equal to 0.9, deleting the matched existing alert and updating the health score.

In accordance with some implementations, a non-transitory computer-readable storage medium stores instructions that when executed by a computer cause the computer to perform a method comprising: calculating a health score for a storage array based on alerts that indicate status change of an object or hardware associated with the storage array; and responsive to receipt of a new alert: matching an object or hardware identified in the new alert to the object or hardware identified in an existing alert; calculating a Jaro-Winkler distance between the new alert and the matched existing alert; and responsive to a determination that the Jaro-Winkler distance between the new alert and the matched existing alert is greater than or equal to 0.9, deleting the matched existing alert and updating the health score.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

Some aspects, features and implementations described herein may include computer devices, components and computer-implemented steps or processes. It will be apparent to those of ordinary skill in the art that the computer-implemented steps or processes may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, process or element is necessarily described herein as part of a computer system. Those of ordinary skill in the art will recognize steps, processes and elements that may have a corresponding computer system or software component. Such computer system and software components are therefore enabled by describing their corresponding steps, processes, or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. The term "physical" is used to refer to tangible features. A "host application" is a computer program that accesses a storage service. A "production volume" is a logical unit of storage that is presented to the host application. Tangible data storage devices are used to implement the storage service and present the production volume.

Figure 1:
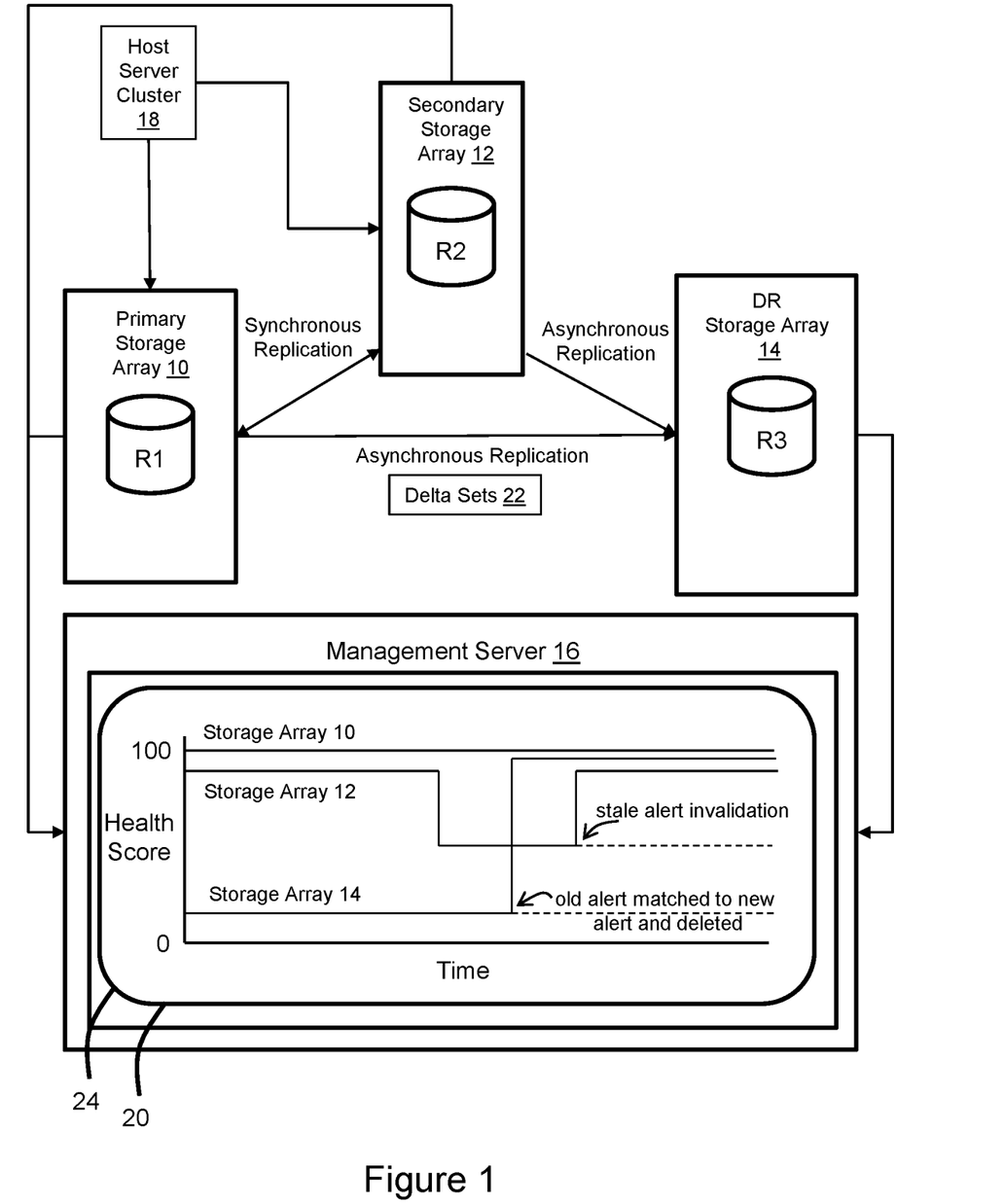
FIG. 1 illustrates a storage system in which alert validation and alert matching are used to identify missed, stale, and redundant alerts to improve the accuracy of health score calculations.

FIG. 1 illustrates a storage system in which alert validation and alert matching are used to identify missed, stale, and redundant alerts to improve the accuracy of health score calculations. The storage system includes a primary storage array 10, secondary storage array 12, and disaster recovery storage array 14 that are monitored by a management server 16. The disaster recovery storage array 14 is configured to asynchronously replicate a host application image stored on replicated storage objects that are maintained by the primary storage array 10 and the secondary storage array 12. The host application image is used by instances of a host application running on a cluster 18 of host servers that include volatile memory, non-volatile storage, and one or more tangible processors. Primary replicas R1 of the storage objects are maintained on the primary storage array. Secondary replicas R2 of the storage objects are maintained on the secondary storage array. Tertiary replicas R3 of the storage objects are maintained on the disaster recovery storage array. The primary replicas R1 may be the production storage objects that are actively accessed by host servers in host server cluster 18. The secondary replicas R2 may be failover storage objects that are ready to be actively accessed by host servers in the host server cluster 18. The tertiary replicas R3 may be maintained for disaster recovery. The R1 and R2 replicas are updated synchronously, whereas the R3 replica is updated asynchronously. The secondary site storage array could be active or passive, while the primary site storage array is active.

The management server 16 is a tangible computing device that runs storage system management software 24 that is stored on non-transitory memory and run by a tangible processor. The management software calculates separate health scores for each of the storage arrays 10, 12, 14. In the illustrated example, the health score is a single numerical value that indicates, relative to predetermined maximum and minimum values, the overall operational health of the associated storage array. For example, and without limitation, the health score could be an integer value between 0 and 100, where 0 is indicative of poorest health and 100 is indicative of best health. The health scores are presented graphically versus time on a dashboard interface 20 so that changes in storage array operational health may be easily observed by a storage administrator. Causes for inaccuracies in health score calculations include missed alerts due to management server reboot and event daemons being down. As will be explained in greater detail below, the management server is configured to identify stale, invalid, and redundant alerts to improve the accuracy of calculated health scores.

Figure 2:
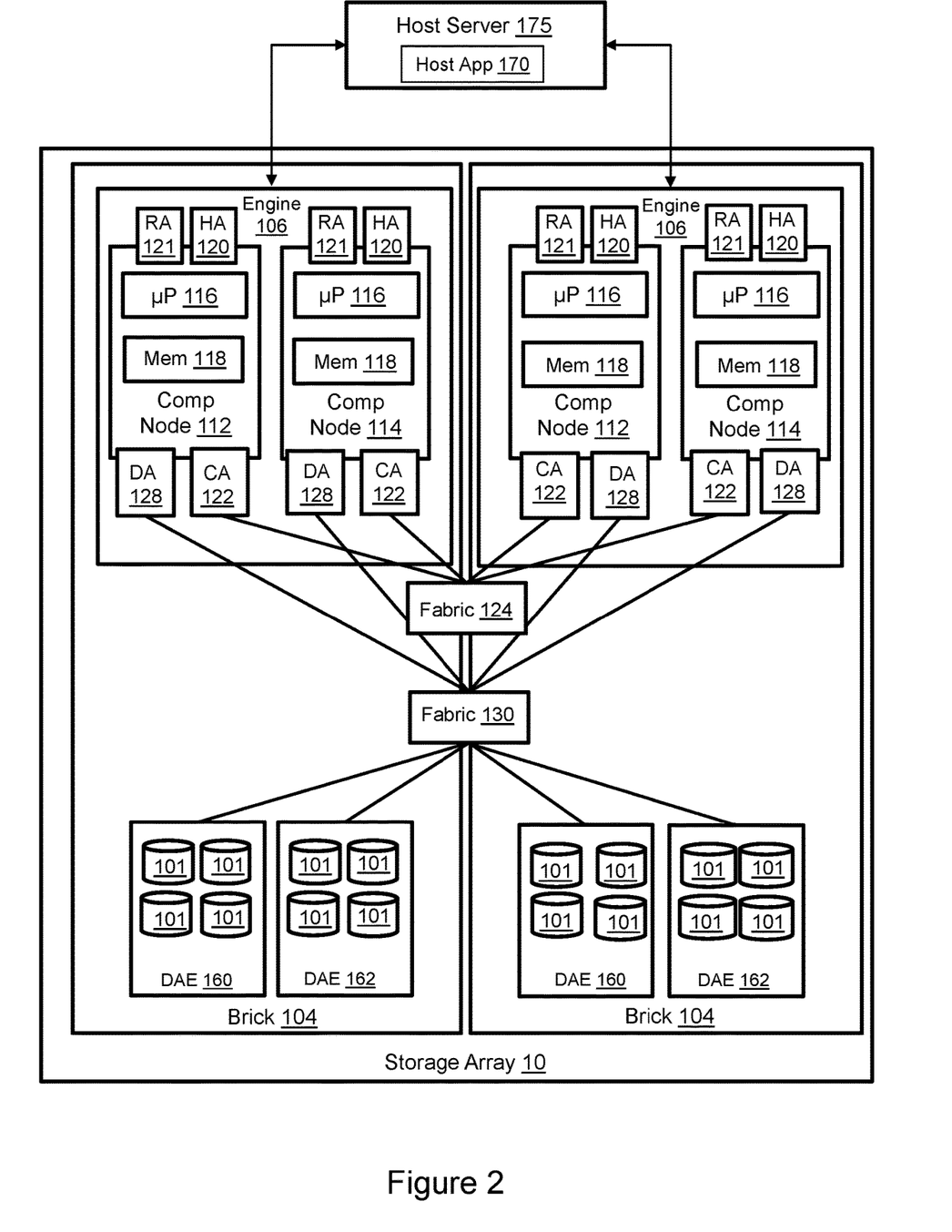
FIG. 2 illustrates a storage array in greater detail.

FIG. 2 illustrates the primary storage array 10 in greater detail. The storage array includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts from the compute nodes 112, 114. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with host servers, e.g., host server 175 that runs host application instance 170. Each host adapter has resources for servicing input-output commands (IOs) from host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets for replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk 101.

Figure 3:
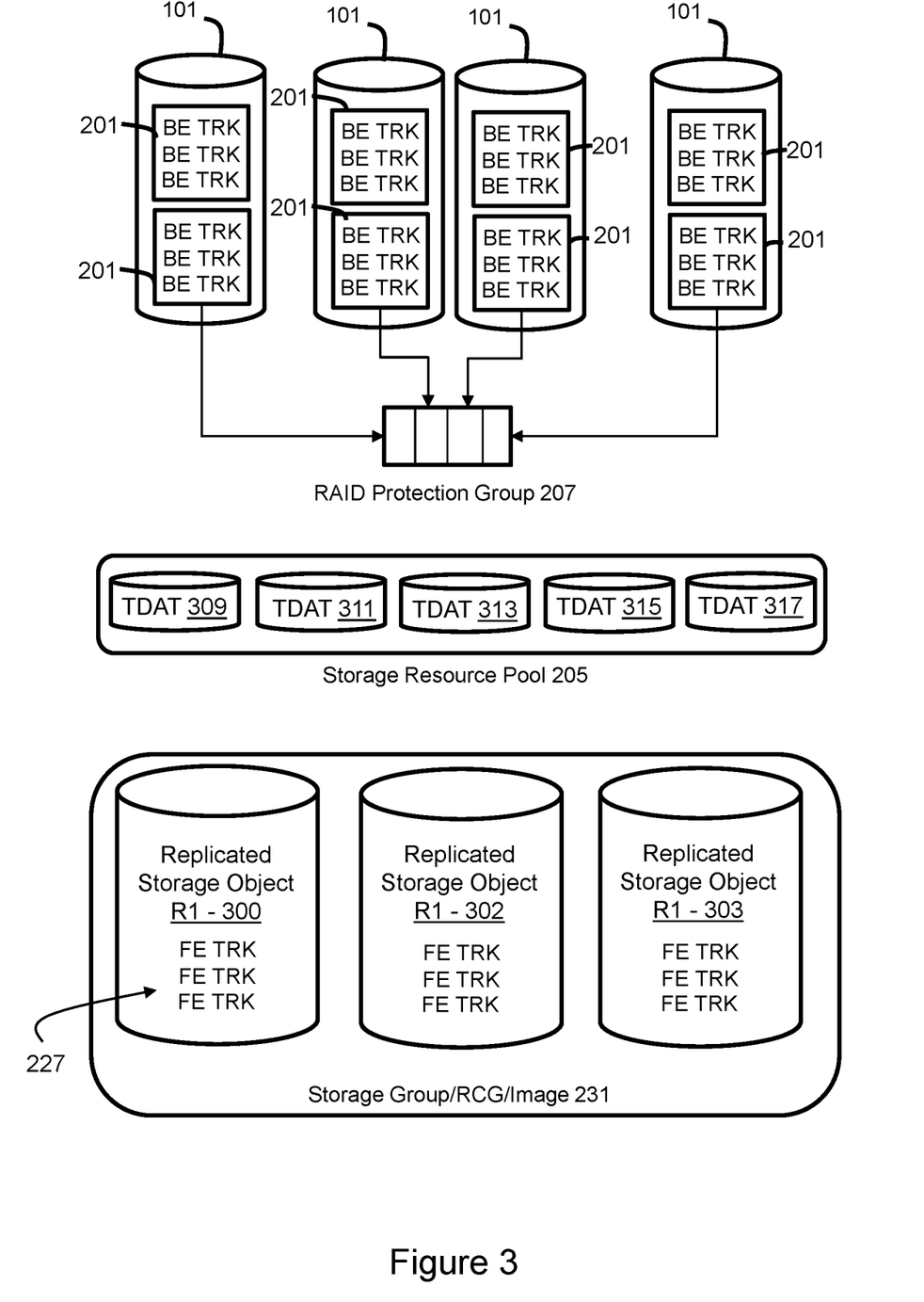
FIG. 3 illustrates layers of abstraction between the managed drives and an image for a host application.

Referring to FIGS. 2 and 3, the host application data that is logically stored on the primary (R1) replicated storage objects 300, 302, 303 is persistently stored on the managed drives 101. Without limitation, storage objects may be referred to as volumes, devices, or LUNs, where a logical unit number (LUN) is a number used to identify logical storage volumes in accordance with the small computer system interface (SCSI) protocol. From the perspective of the host servers, each production storage object is a single disk drive having a set of contiguous logical block addresses (LBAs) on which data used by the instances of a host application resides. However, the host application data is stored at non-contiguous addresses on various managed drives 101. The compute nodes 112, 114 maintain metadata that maps between the LBAs of the production storage objects and physical addresses on the managed drives. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects. The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory. A storage group 231 of multiple replicated storage objects may be created for an individual host application. The storage group is a replication consistency group, and the data stored therein may be referred to as a host application image. Multiple instances of a single host application may use data from the same storage group, but instances of different host applications do not use data from the same storage group. The storage array may maintain a large number of production storage objects and storage groups.

Figure 4:
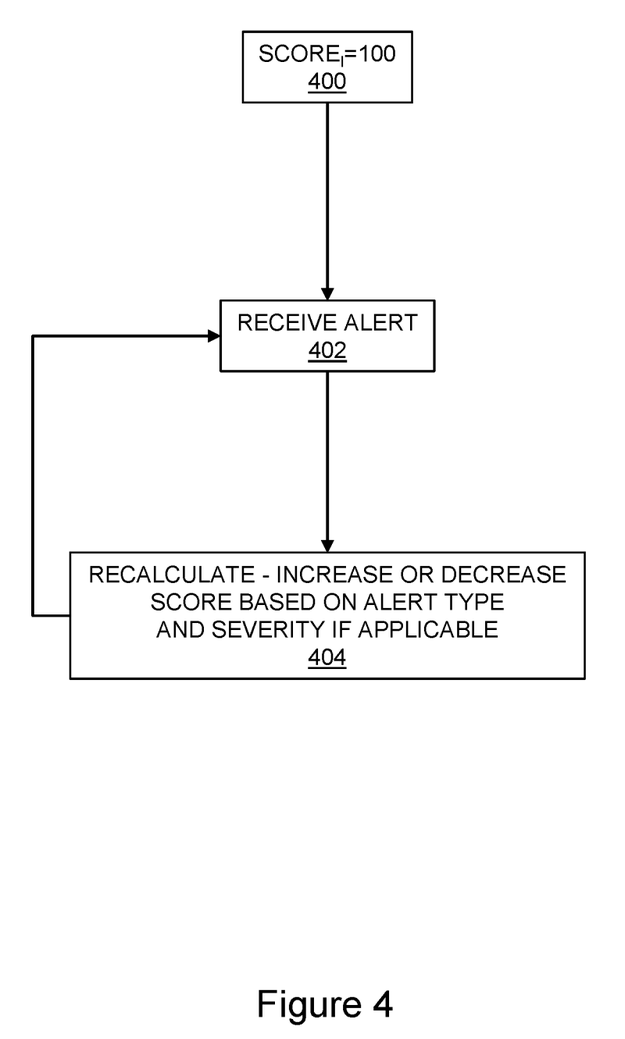
FIG. 4 illustrates basic storage array health score calculation.

FIG. 4 illustrates basic calculation of the storage array health score. The health score of a storage array is initialized to a maximum value of 100 as indicated in step 400. Storage arrays are configured to generate a wide variety of alerts based on monitored key performance indicators (KPIs). In response to receipt of an alert as indicated in step 402, the health score is recalculated as indicated in step 404. The storage array health score may be calculated based on four component values: a physical component health score, a logical component health score, a service level objective (SLO) component health score, and a best practice configuration (BPC) component health score. Hardware used for calculation of the physical component score may include but is not limited to: engines, compute nodes, FE ports, FE directors/adapters, BE ports, BE directors/adapters, CAs, CA ports, cache/cache partitions, managed drives, boards, and board-level subsystems. The KPIs for each hardware element may include utilization, e.g., expressed as a % relative to maximum capability. Queue depth may also be used as a KPI, e.g., in the case of FE directors. Objects for calculation of the logical component score may include but are not limited to: storage objects, storage groups (SGs), and host applications. The KPIs for each logical component category may include response time. Broadly, the workload states of SGs that are associated with SLOs may include underperforming, marginally performing, and performing. BPC objects may include but are not limited to: equivalent cache size across all engines; equivalent numbers of FEs across all engines; having X % of total storage capacity as SSD storage capacity; minimum capacity of individual SSDs; minimum of one RAID group per board; RAID-1—two per computing node (4 drives per engine); RAID-5 (3+1)—four per computing node (8 drives per engine); RAID-5 (7+1)—eight per computing node (16 drives per engine); engine capacity; variety of drive types; drive types with RAID levels; number of ports; and mix of components. Each BPC rule may be associated with a score deduction or range of score deductions. The health score of the storage array is increased or decreased by a predetermined number of points based on alert type, i.e., each type of alert that factors into health score calculations is associated with a point value based on severity. For example, an alert indicative of failure of a compute node, which is a relatively severe problem, may correspond to a reduction of the health score by 50 points, whereas an alert indicative of failure of a drive, which is a relatively less severe problem, may correspond to a decrease of the health score by only 10 points. Similarly, an alert indicative of restoration of a compute node may correspond to an increase of the health score by 50 points, whereas an alert indicative of replacement of a drove may correspond to an increase of the health score by only 10 points. Some types of alerts do not change the health score and are not associated with point values.

Figure 5:
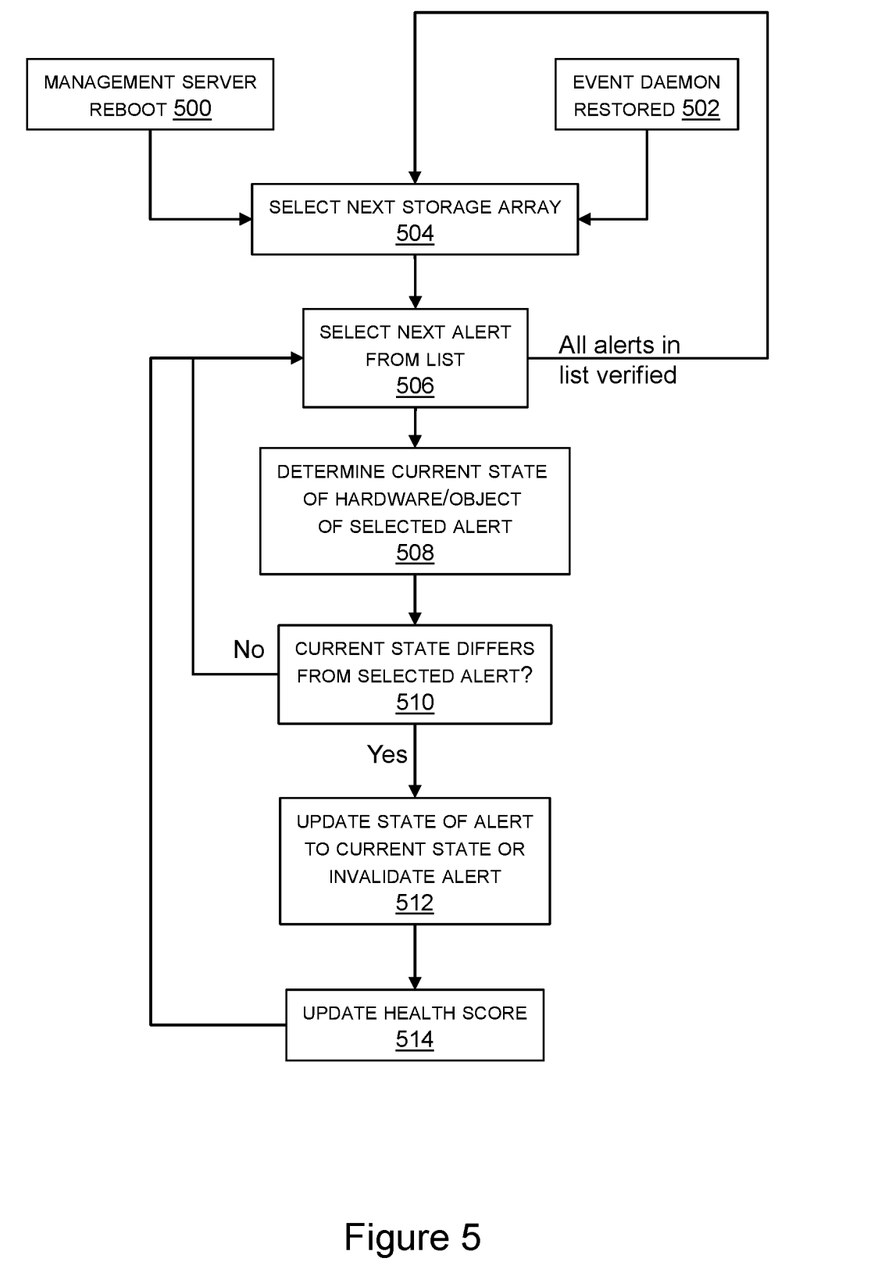
FIG. 5 illustrates alert validation.

FIG. 5 illustrates alert validation. Alert validation is triggered by either of two events: reboot of the management server (or management software) as indicated in step 500; and restoration of an event daemon that was down as indicated in step 502. Unavailability of the management server or event daemon can result in alerts being missed by the management software. Because multiple alerts can be related, missed alerts can result in other alerts becoming stale and invalid. The alert validation procedure loops through alert lists that are maintained for each storage array. The next storage array is selected in step 504. The next alert is selected from the list in step 506. Step 508 is determining the current state of the hardware or object of the selected alert. For example, if the selected alert indicates that a logical device is inaccessible or a physical subsystem has failed, then it is determined whether the logical device is currently accessible, or the physical subsystem is currently operational. Step 510 is determining whether the current state differs from the state indicated by the selected alert. If the current state does not differ from the state indicated by the selected alert, then flow returns to step 506. If the current state differs from the state indicated by the selected alert, then step 512 is updating the state indicated by the selected alert to match the current state or invalidating the alert. Updating the state may change the point value associated with the alert. For example, a failure type may have different point values associated with different levels of failure severity and the level of failure severity may have changed. Alternatively, an alert may be invalidated based on a determination that the failure condition no longer exists. The health score is updated in step 514, followed by selecting the next alert from the list in step 506. Looping continues until all alerts have been subjected to validation.

Figure 6:
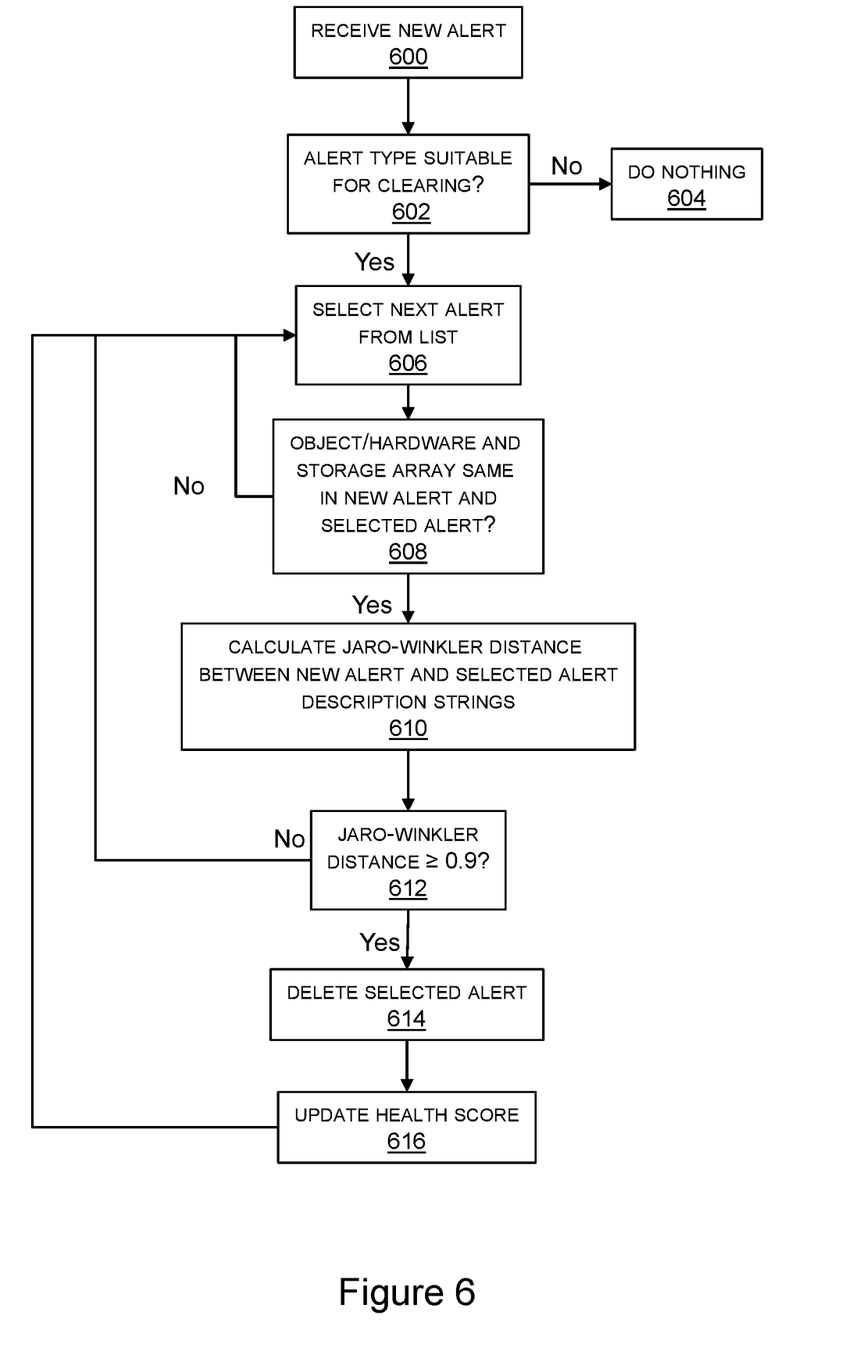
FIG. 6 illustrates alert matching.

FIG. 6 illustrates alert matching. A new alert is received by the storage system management software in step 600. Step 602 is determining whether the alert is of a type that is suitable for clearing. Alerts that are not associated with health score calculations are not suitable for clearing, in which case no action is taken as indicated in step 604. If the new alert is suitable for clearing, then the next alert is selected from the list in step 606. Step 608 is determining whether the object/hardware and storage array identified in the new alert is the same as the object/hardware and storage array of the selected alert. If not, then the next alert is selected from the list in step 606. If the object/hardware and storage array match, then step 610 is calculating the Jaro-Winkler distance between the new alert and selected alert description strings. The management server may receive multiple alerts associated with the same object/hardware and those alerts may be redundant. However, redundant alerts are not necessarily identical. The Jaro-Wrinkler distance is a measure used to calculate the edit distance between two strings. In other words, it measures the similarity of strings based around the number of edits that the strings would require to match each other. The value of the distance is between 0 to 1. A value of 1 means the strings are equal and a value of 0 means there is no similarity between the two strings. The value of 0.9 indicates that the strings are highly similar and a few minor edits to either one would make them a perfect match, which is suitable for matching redundant health score alerts for auto-clearing. If the Jaro-Winkler distance is less than 0.9 as determined in step 612, then the next alert is selected from the list in step 606. If the Jaro-Winkler distance is greater than or equal to 0.9 as determined in step 612, then the selected alert is deleted in step 614 and the health score is updated in step 616. Looping continues until all the alerts in the list have been tested.

Advantages should not be considered as limitations to the inventive concepts but at least some implementations have advantages such as identifying stale, invalid, and redundant alerts and improving the accuracy of the health score calculations by updating or deleting the stale, invalid, and redundant alerts. Moreover, the techniques are generalized such that modified alert types and newly created alert types can be processed without extensively rebuilding the validation and matching routines.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a storage management server configured to manage a storage array comprising a plurality of tangible data storage devices and a plurality of compute nodes, each compute node comprising at least one processor and memory, wherein the compute nodes present at least one production volume to a host application, the production volume being backed by the tangible data storage devices, the storage management server comprising program code stored on non-transitory computer-readable memory and including instructions that calculate a health score for the storage array based on alerts that indicate status changes of an object or hardware associated with the storage array, the program code comprising instructions responsive to receipt of a new alert to:
match the object or hardware identified in the new alert to the object or hardware identified in an existing alert;
calculate Jaro-Winkler distance between the new alert and the matched existing alert; and
responsive to a determination that the Jaro-Winkler distance between the new alert and the matched existing alert is greater than or equal to 0.9, delete the matched existing alert and update the health score.

2. The apparatus of claim 1 further comprising the storage management server configured to calculate individual health scores for each of a plurality of storage arrays.

3. The apparatus of claim 2 further comprising the instructions responsive to receipt of a new alert being configured to match the object or hardware associated with one of the plurality of storage arrays identified in the new alert to the object or hardware identified in an existing alert associated with that storage array.

4. The apparatus of claim 3 further comprising the instructions responsive to receipt of a new alert being configured to determine that the new alert is of a type that is suitable for clearing.

5. The apparatus of claim 4 further comprising program code comprising instructions responsive to management server reboot or an event daemon being restored to validate existing alerts.

6. The apparatus of claim 5 further comprising the program code comprising instructions responsive to management server reboot or an event daemon being restored to determine whether current state of the object or hardware differs from object or hardware state indicated in the existing alerts.

7. The apparatus of claim 6 further comprising the program code comprising instructions responsive to management server reboot or an event daemon being restored to invalidate existing alerts for which object or hardware state differs from current state.

8. A method comprising:
calculating a health score for a storage array based on alerts that indicate status change of an object or hardware associated with the storage array; and
responsive to receipt of a new alert:
matching an object or hardware identified in the new alert to the object or hardware identified in an existing alert;
calculating a Jaro-Winkler distance between the new alert and the matched existing alert; and
responsive to a determination that the Jaro-Winkler distance between the new alert and the matched existing alert is greater than or equal to 0.9, deleting the matched existing alert and updating the health score.

9. The method of claim 8 further comprising calculating individual health scores for each of a plurality of storage arrays.

10. The method of claim 9 further comprising matching the object or hardware associated with one of the plurality of storage arrays identified in the new alert to the object or hardware identified in an existing alert associated with that storage array.

11. The method of claim 10 further comprising determining that the new alert is of a type that is suitable for clearing.

12. The method of claim 11 further comprising validating existing alerts responsive to management server reboot or an event daemon being restored to validate existing alerts.

13. The method of claim 12 further comprising validating existing alerts by determining whether current state of the object or hardware differs from object or hardware state indicated in the existing alerts.

14. The method of claim 13 further comprising invalidating existing alerts for which object or hardware state differs from current state.

15. A non-transitory computer-readable storage medium storing instructions that when executed by a computer cause the computer to perform a method comprising:
calculating a health score for a storage array based on alerts that indicate status change of an object or hardware associated with the storage array; and
responsive to receipt of a new alert:
matching an object or hardware identified in the new alert to the object or hardware identified in an existing alert;
calculating a Jaro-Winkler distance between the new alert and the matched existing alert; and
responsive to a determination that the Jaro-Winkler distance between the new alert and the matched existing alert is greater than or equal to 0.9, deleting the matched existing alert and updating the health score.

16. The non-transitory computer-readable storage medium of claim 15 in which the method further comprises calculating individual health scores for each of a plurality of storage arrays.

17. The non-transitory computer-readable storage medium of claim 16 in which the method further comprises matching the object or hardware associated with one of the plurality of storage arrays identified in the new alert to the object or hardware identified in an existing alert associated with that storage array.

18. The non-transitory computer-readable storage medium of claim 17 in which the method further comprises validating existing alerts responsive to management server reboot or an event daemon being restored to validate existing alerts.

19. The non-transitory computer-readable storage medium of claim 18 in which the method further comprises validating existing alerts by determining whether current state of the object or hardware differs from object or hardware state indicated in the existing alerts.

20. The non-transitory computer-readable storage medium of claim 19 in which the method further comprises invalidating existing alerts for which object or hardware state differs from current state.

* * * * *